March 26, 1935.  H. KLEMPERER  1,995,810

ELECTRIC WELDING CONTROL SYSTEM

Filed Aug. 17, 1934

WITNESSES:

INVENTOR
Hans Klemperer.
BY
ATTORNEY

Patented Mar. 26, 1935

1,995,810

UNITED STATES PATENT OFFICE 1,995,810

ELECTRIC WELDING CONTROL SYSTEM

Hans Klemperer, New York, N. Y., assignor to Westinghouse Electric & Manufacturing Company, East Pittsburgh, Pa., a corporation of Pennsylvania Application August 17, 1934, Serial No. 740,225
In Germany November 18, 1933

16 Claims. (Cl. 250—27)

This invention relates, generally, to welding and it has particular relation to electric resistance welding.

The object of the invention, generally stated, is to provide a resistance welding system which shall be simple and efficient in operation and which may be readily and economically manufactured and installed.

The principal object of the invention is to provide for controlling the flow of current in an electric circuit to prevent saturation in the magnetic circuits of transformers which may be associated with the circuit.

Another important object of the invention is to provide for insuring that at least two successive half cycles of alternating current will be permitted to flow in an electric circuit such as, for example, a resistance welding circuit.

A further object of the invention is to provide for causing a pair of arc discharge devices, inversely connected in a welding circuit, or the like, to sequentially become conducting.

Other objects of the invention will, in part, be obvious and, in part, appear hereinafter.

The invention accordingly is disclosed in the embodiment hereof shown in the accompanying drawing, and comprises the features of construction, combination of elements and arrangement of parts which will be exemplified in the construction hereinafter set forth, and the scope of the application of which will be indicated in the appended claims.

Figure 1:
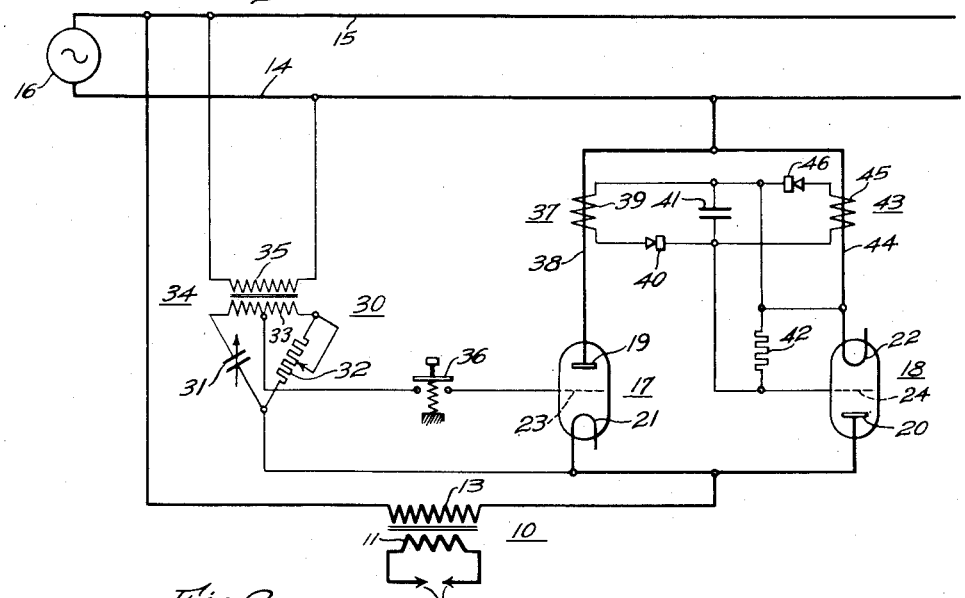
Figure 2:
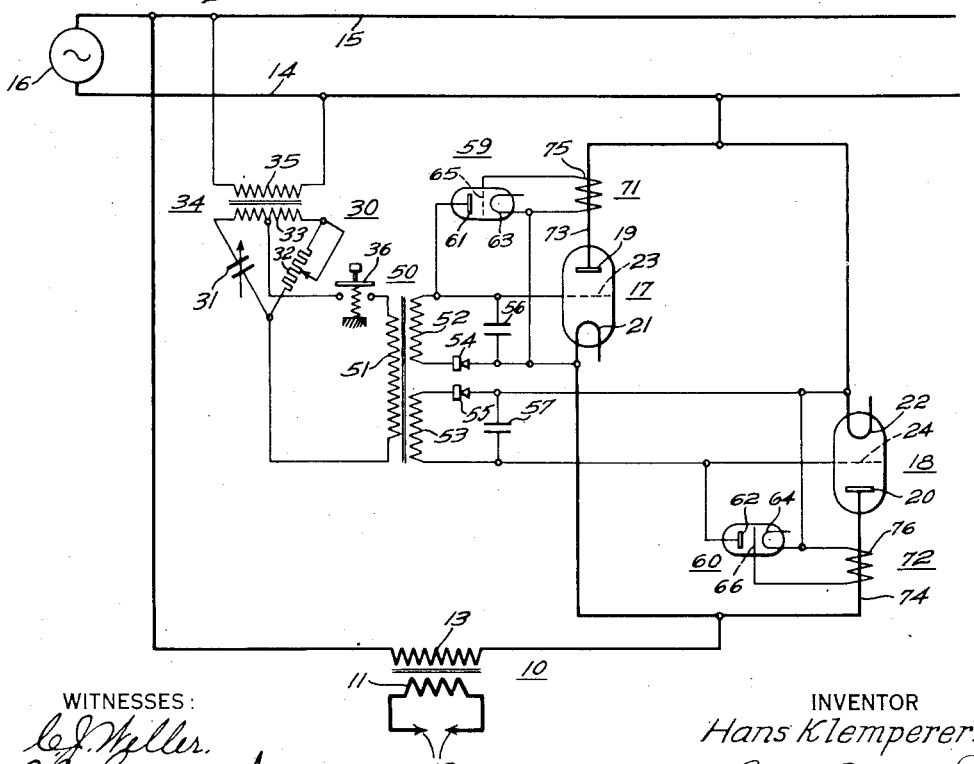

For a more complete understanding of the nature and scope of this invention, reference may be had to the following detailed description, taken in connection with the accompanying drawing, in which:

Figure 1 illustrates diagrammatically a welding system organized in accordance with this invention; and Fig. 2 illustrates diagrammatically a modification of the welding system illustrated in Fig. 1.

Referring now particularly to Fig. 1 of the drawing, the reference character 10 designates generally a welding transformer having a secondary winding 11 which is connected to energize a pair of welding electrodes 12, between which may be placed the work on which the welding operation is to be performed. The transformer 10 is also provided with a primary winding 13 which may be connected across conductors 14 and 15 that are energized from a source 16 of alternating current, which may be a 60-cycle source.

In order to control the flow of current to the welding transformer 10, a pair of arc discharge devices 17 and 18 are interposed between one terminal of the primary winding 13 and the energized conductor 14. Each of the arc discharge devices 17 and 18 is provided, respectively, with an anode 19 and 20, a cathode 21 and 22, and a control electrode 23 and 24. It will be observed that the anode 19 and the cathode 22 are connected together and to the conductor 14, while the cathode 21 and the anode 20 are connected together and to one terminal of the primary winding 13. With these connections, the arc discharge devices 17 and 18 may be considered to be inversely connected so that successive half cycles of the alternating current may be conducted therethrough, it being understood that each of the arc discharge devices 17 and 18 is disposed to be conducting only during a particular half cycle. It will be understood that the construction of the arc discharge devices 17 and 18 forms no part of this invention, and therefore, their illustration is diagrammatical only.

In order to render the arc discharge device 17 conducting, an energizing potential may be applied to the control electrode 23 at the proper time by means of a phase shifting circuit shown generally at 30. This circuit comprises an adjustable capacitor 31 and a potentiometer 32, which may be connected, as illustrated, across the secondary winding 33 of a transformer shown generally at 34, which is provided with a primary winding 35 that is connected across the energized conductors 14 and 15. It will be observed that the control electrode 23 is connected through a push-button control switch 36 to the mid-tap of the secondary winding 33, while the common connection between the capacitor 31 and the potentiometer 32 is connected to the cathode 21. When the push-button switch 36 is depressed, an energizing potential will be applied to the control electrode 23 which may be so adjusted, as will be readily understood by those skilled in the art, to render the arc discharge device 17 conducting at the proper time in the half cycle for which it is disposed to be conducting.

While, in this embodiment of the invention, a push-button switch 36 has been illustrated for controlling the application of energizing potential to the control electrode 23, it will be understood that any other suitable type of control apparatus may be used. For instance, a mechanically-driven switch may be provided for opening and closing the energizing circuit to the control electrode 23 during predetermined intervals which may or may not be synchronized with the frequency of the alternating current which is obtained from the source 16.

In order to prevent the saturation of the core of the welding transformer 10, it is desirable that the alternating current be permitted to flow for at least two successive half cycles or multiples thereof. If the alternating current is permitted to flow during a positive half cycle, and later is again permitted to flow during a positive half cycle without the interposition of a negative half cycle, it will be readily understood that the core of the welding transformer 10 will become saturated and that relatively large direct-current components of the alternating current will flow in the primary winding 13. These currents may become so great in value that they may destroy the arc discharge devices 17 and 18.

In order to insure that successive half cycles of the alternating current will be permitted to flow, the arc discharge device 18 is rendered conducting in response to the arc discharge device 17 having first been rendered conducting. In order to provide for such operation, a current transformer shown generally at 37 is provided, the primary winding of which may be represented by the conductor 38 which is connected to the anode 19. The current transformer 37 is provided with a secondary winding 39 which is connected through a rectifier 40 and across the control electrode 24 and the cathode 22 of the arc discharge device 18. A capacitor 41 is also connected across the control electrode 24 and the cathode 22, in order to assume a charge which is applied thereto to apply the necessary energizing potential to the control electrode 24 during the succeeding half cycle.

It is desirable that the capacitor 41 be immediately discharged as soon as the arc discharge device 18 has been rendered conducting, so that the latter cannot again be rendered conducting unless the arc discharge device 17 has first been rendered conducting. For this purpose, a resistor 42 may be connected in shunt circuit relation with the capacitor 41 which will discharge through it to such a potential that the charge remaining on the capacitor 41 is not sufficient to cause the arc discharge device 18 to again be rendered conducting.

In order to further insure that the capacitor 41 will be discharged on flow of current through the arc discharge device 18 during the half cycle for which it is adapted to be conducting, a second current transformer 43 may be provided, the primary winding of which may comprise the conductor 44 which is connected to the cathode 22. The current transformer 43 is provided with a secondary winding 45 which is connected through a rectifier 46 across the capacitor 41.

In operation it will be assumed that the proper energizing potentials have been applied to the various elements of the system, and that the phase shifting circuit 30 has been adjusted to cause the arc discharge device 17 to become conducting at the proper time in the half cycle of the alternating current during which it is disposed to be conducting.

The operator then depresses the control switch 36, or the circuit is completed by any suitable contact making device, so that the proper energizing potential is applied to the control electrode 23. The arc discharge device 17 is then rendered conducting and the half cycle of alternating current which it is disposed to conduct is permitted to pass therethrough, and a corresponding half cycle of the alternating current will traverse the work which is positioned between the welding electrodes 12. The flow of current through the arc discharge device 17 induces a current in the secondary winding 39 of the current transformer 37 which causes the capacitor 41 to be charged to a predetermined potential.

The potential to which the capacitor 41 is charged is of the proper value and polarity to apply energizing potential to the control electrode 24 of the arc discharge device 18 in the next succeeding half cycle. The arc discharge device 18 then becomes conducting for the next succeeding half cycle of alternating current which is permitted to flow therethrough. Correspondingly, the next half cycle of the alternating current is caused to flow through the work between the welding electrodes 12.

If the capacitor 41 has not been discharged through the resistor 42, it will be completely discharged due to the application of a potential thereto by means of the current transformer 43 on the arc discharge device 18 becoming conducting, this potential being opposite in polarity to the potential that is applied thereto by the current transformer 37. It will be understood that either the resistor 42 or the current transformer 43 and rectifier 46 may be used for discharging the capacitor 41 or that both of them may be used.

The foregoing cycle of operation will be repeated as long as the control switch 36 is depressed or the energizing circuit to the control electrode 23 is completed. As soon as this circuit is opened, it will be understood that welding current ceases to flow only after at least two successive half cycles or multiples thereof have been permitted to flow.

In the modification of the invention illustrated in Fig. 2 of the drawing, the same reference characters are applied as were applied for Fig. 1, where the same apparatus is illustrated. The sequential control of the arc discharge devices 17 and 18 is slightly modified.

In order to apply the necessary energizing potential to the control electrodes 23 and 24, a transformer is shown generally at 50 having a primary winding 51 and a pair of secondary windings 52 and 53, each of which is illustrated as being individual to the control electrodes 23 and 24, and each of which is connected through a rectifier 54 and 55 to the cathodes 21 and 22. Capacitors 56 and 57, each individual to the control electrodes 23 and 24, are also provided, and are connected in shunt circuit relation with the control electrodes 23 and 24 and the cathodes 21 and 22.

In order to insure that the capacitors 56 and 57 will be discharged, space discharge devices 59 and 60 are connected, respectively, in shunt circuit relation with the capacitors 56 and 57. The space discharge devices 59 and 60 are provided, respectively, with anodes 61 and 62, cathodes 63 and 64, and control electrodes 65 and 66. The space discharge devices 59 and 60 are disposed to be rendered conducting by means of current transformers shown generally at 71 and 72, the primary windings of which may, respectively, comprise conductors 73 and 74. The current transformers 71 and 72 are provided, respectively, with primary windings 75 and 76, which are connected, as illustrated, to apply energizing potential to the control electrodes 65 and 66.

Assuming, for the purposes of illustration, that a direct-current impulse is applied to the primary winding of the transformer 50, potentials will appear across the terminals of the secondary windings 52 and 53 which will or will not be applied to the capacitors 56 and 57, depending upon the connections of the rectifiers 54 and 55. It will be assumed that the rectifier 54 is so connected as to permit the flow of current from the secondary winding 52 on the application of a direct-current impulse to the primary winding 51. As a result, the capacitor 56 will be charged to a predetermined value which will be sufficient to energize the control electrode 23 and to render the arc discharge device 17 conducting to permit the flow of the half cycle of the alternating current which it is disposed to conduct. As soon as the arc discharge device 17 becomes conducting, energizing potential will be applied to the control electrode 65 of the space discharge device 59, which will then become conducting to short-circuit the capacitor 56 and to discharge it.

During this interval, because of the connection of the rectifier 55, the arc discharge device 18 has not been rendered conducting. However, when the direct-current impulse is removed from the primary winding 51, the polarities of the potentials appearing across the terminals of the secondary windings 52 and 53 will be reversed, and in this instance capacitor 57 will be charged to apply the necessary energizing potential to the control electrode 24, thereby rendering the arc discharge device 18 conducting to permit the flow of the half cycle of the alternating current which it is disposed to conduct. The capacitor 57 will then immediately be discharged due to the space discharge device 60 becoming conducting in the manner set forth hereinbefore in regard to the functioning of space discharge device 59 under similar conditions.

From the foregoing, it will be understood that the arc discharge devices 17 and 18 will always be rendered sequentially conducting when a control potential is applied to and removed from the primary windings 51 of the transformer 50.

In order to synchronize the application of the control potential applied to the primary winding 51 with the frequency of the source 16, the phase shifting circuit 30 described hereinbefore may be used. The circuit may be controlled by means of the push-button switch 36, or, as has been suggested hereinbefore, any other suitable type of control may be provided for completing the circuit during a predetermined interval.

The application of the alternating current to the primary winding 51 will cause the system to function sequentially in a manner which has been illustrated in connection with the application of a direct-current impulse. It is preferable to apply the alternating current for controlling the operation of the system in order that it may more readily be synchronized with the frequency of the source 16.

While the herein described control system has been illustrated in connection with a welding circuit, it will be obvious to those skilled in the art that it may be used in connection with other circuits. Thus, it may be used in a circuit which is adapted to be continuously conducting but which it is desired to render non-conducting for a predetermined number of cycles. Through the use of this invention it is possible to render the circuit non-conducting for at least two successive half cycles, thereby avoiding the saturation of the magnetic circuits of the transformers which may be associated with the system, as set forth hereinbefore.

Since certain further changes may be made in the above construction, different embodiments of the invention may be made without departing from the scope thereof, it is intended that all matter contained in the above description or shown in the accompanying drawing shall be interpreted as illustrative and not in a limiting sense.

I claim as my invention:

1. An electric control system comprising, in combination, a load circuit, circuit means for connecting the load circuit to a source of alternating current, a pair of inversely connected arc discharge devices interposed in said circuit means for controlling the flow of current to said load circuit, and control means connected to be responsive to the flow of current through one of said arc discharge devices for rendering the other arc discharge device conducting.

2. An electric control system comprising, in combination, a load circuit, circuit means for connecting the load circuit to a source of alternating current, a pair of inversely connected arc discharge devices interposed in said circuit means for controlling the flow of current to said load circuit, and control means effective to render said arc discharge devices conducting during at least two succeeding half cycles of the alternating current in response to one of said arc discharge devices being rendered conducting.

3. An electric control system comprising, in combination, a load circuit, circuit means for connecting the load circuit to a source of alternating current, a pair of inversely connected arc discharge devices interposed in said circuit means for controlling the flow of current to said load circuit, and control means connected to sequentially cause one of said arc discharge devices to become conducting as a result of the other arc discharge device becoming conducting.

4. An electric control system comprising, in combination, a load circuit, circuit means for connecting the load circuit to a source of alternating current, a pair of inversely connected arc discharge devices interposed in said circuit means for controlling the flow of current to said load circuit, means for rendering one of said arc discharge devices conducting at a predetermined time in a half cycle of the alternating current which it is disposed to conduct, and control means connected to sequentially render the other of said arc discharge devices conducting during the succeeding half cycle of the alternating current as a result of said one arc discharge device becoming conducting.

5. An electric control system comprising, in combination, a load circuit, circuit means for connecting the load circuit to a source of alternating current, a pair of inversely connected arc discharge devices interposed in said circuit means for controlling the flow of current to said load circuit, means for rendering said arc discharge devices conducting, and control means connected to energize said last-named means to sequentially cause one of said arc discharge devices to become conducting after the other arc discharge device has been rendered conducting.

6. An electric control system comprising, in combination, a load circuit, circuit means for connecting the load circuit to a source of alternating current, a pair of inversely connected arc discharge devices interposed in said circuit means for controlling the flow of current to said load circuit, means for rendering one of said arc discharge devices conducting, and control means connected to be responsive to the flow of current through said one arc discharge device for rendering the other arc discharge device conducting.

7. An electric control system comprising, in combination, a load circuit, circuit means for connecting the load circuit to a source of alternating current, a pair of inversely connected arc discharge devices interposed in said circuit means for controlling the flow of current to said load circuit, a control electrode in each of said arc discharge devices, means for energizing the control electrode of one of said arc discharge devices at a predetermined time in the half cycle of the alternating current for which it is disposed to be conducting, and control means connected to be responsive to the flow of current through said one arc discharge device for energizing the control electrode of the other arc discharge device for rendering it conducting during the succeeding half cycle of alternating current.

8. An electric control system comprising, in combination, a load circuit, circuit means for connecting the load circuit to a source of alternating current, a pair of inversely connected arc discharge devices interposed in said circuit means for controlling the flow of current to said load circuit, control means connected to sequentially cause one of said arc discharge devices to become conducting as a result of the other arc discharge device becoming conducting, and means for preventing said one arc discharge device from again being rendered conducting unless said other arc discharge device is again rendered conducting.

9. An electric control system comprising, in combination, a load circuit, circuit means for connecting the load circuit to a source of alternating current, a pair of inversely connected arc discharge devices interposed in said circuit means for controlling the flow of current to said load circuit, a control electrode in each of said arc discharge devices, means for energizing the control electrode of one of said arc discharge devices at a predetermined time in the half cycle of the alternating current for which it is disposed to be conducting, a capacitor connected to the control electrode of the other of said arc discharge devices, and means responsive to the flow of current through said one arc discharge device for charging said capacitor to energize said last-named control electrode during the next succeeding half cycle to render said other arc discharge device conducting.

10. An electric control system comprising, in combination, a load circuit, circuit means for connecting the load circuit to a source of alternating current, a pair of inversely connected arc discharge devices interposed in said circuit means for controlling the flow of current to said load circuit, a control electrode in each of said arc discharge devices, means for energizing the control electrode of one of said arc discharge devices at a predetermined time in the half cycle of the alternating current for which it is disposed to be conducting, a capacitor connected to the control electrode of the other of said arc discharge devices, a current transformer having a primary winding connected in the circuit to said one arc discharge device and a secondary winding, and a rectifier, said secondary winding being connected across said capacitor through said rectifier to effect the charging of said capacitor for energizing the control electrode of said other arc discharge device during the next succeeding half cycle of the alternating current.

11. An electric control system comprising, in combination, a load circuit, circuit means for connecting the load circuit to a source of alternating current, a pair of inversely connected arc discharge devices interposed in said circuit means for controlling the flow of current to said load circuit, a control electrode in each of said arc discharge devices, means for energizing the control electrode of one of said arc discharge devices at a predetermined time in the half cycle of the alternating current for which it is disposed to be conducting, a capacitor connected to the control electrode of the other of said arc discharge devices, a current transformer having a primary winding connected in the circuit to said one arc discharge device and a secondary winding, a rectifier, said secondary winding being connected across said capacitor through said rectifier to effect the charging of said capacitor for energizing the control electrode of said other arc discharge device during the next succeeding half cycle of the alternating current, and a resistor connected in shunt circuit relation with said capacitor for discharging it to prevent the reenergization of the control electrode of said other arc discharge device unless said one arc discharge device is first rendered conducting.

12. An electric control system comprising, in combination, a load circuit, circuit means for connecting the load circuit to a source of alternating current, a pair of inversely connected arc discharge devices interposed in said circuit means for controlling the flow of current to said load circuit, a control electrode in each of said arc discharge devices, means for energizing the control electrode of one of said arc discharge devices at a predetermined time in the half cycle of the alternating current for which it is disposed to be conducting, a capacitor connected to the control electrode of the other of said arc discharge devices, a current transformer having a primary winding connected in the circuit to said one arc discharge device and a secondary winding, a rectifier, said secondary winding being connected across said capacitor through said rectifier to effect the charging of said capacitor for energizing the control electrode of said other arc discharge device during the next succeeding half cycle of the alternating current, a second current transformer having a primary winding connected in the circuit to said other arc discharge device and a secondary winding, and a second rectifier, said last-named secondary winding being connected across said capacitor through said second rectifier in such manner as to insure the discharge of said capacitor on said other arc discharge device becoming conducting to prevent its again becoming conducting unless said one arc discharge device is first rendered conducting.

13. An electric control system comprising, in combination, a load circuit, circuit means for connecting the load circuit to a source of alternating current, a pair of inversely connected arc discharge devices interposed in said circuit means for controlling the flow of current to said load circuit, a control electrode in each of said arc discharge devices, and means for energizing the control electrode of one of said arc discharge devices by the application of a control impulse and for energizing the control electrode of the other of said arc discharge devices by the removal of said control impulse to effect the sequential operation of said arc discharge devices.

14. An electric control system comprising, in combination, a load circuit, circuit means for connecting the load circuit to a source of alternating current, a pair of inversely connected arc discharge devices interposed in said circuit means for controlling the flow of current to said load circuit, a control electrode in each of said arc discharge devices, a transformer having a primary winding and a pair of secondary windings each individual to a control electrode, and a rectifier interposed in the circuit to each of said control electrodes and disposed to effect the energization of one of said control electrodes on the application of a control impulse to said primary winding and to effect the energization of the other of said control electrodes on the removal of said control impulse to effect the sequential operation of said arc discharge devices.

15. An electric control system comprising, in combination, a load circuit, circuit means for connecting the load circuit to a source of alternating current, a pair of inversely connected arc discharge devices interposed in said circuit means for controlling the flow of current to said load circuit, a control electrode in each of said arc discharge devices, a transformer having a primary winding connected to be energized from said source of alternating current and a pair of secondary windings each individual to a control electrode, and a rectifier interposed in the circuit to each of said control electrodes and disposed to effect the energization of one of said control electrodes on application to said primary winding of a predetermined portion of a cycle of the alternating current and to effect the energization of the other of said control electrodes on the application to said primary winding of a successive predetermined portion of said cycle of alternating current to effect the sequential operation of said arc discharge devices for conducting successive half cycles of the alternating current.

16. An electric control system comprising, in combination, a load circuit, circuit means for connecting the load circuit to a source of alternating current, a pair of inversely connected arc discharge devices interposed in said circuit means for controlling the flow of current to said load circuit, a control electrode in each of said arc discharge devices, a transformer having a primary winding and a pair of secondary windings each individual to a control electrode, a rectifier interposed in the circuit to each of said control electrodes, a capacitor individual to each control electrode and disposed to be charged through the rectifier individual thereto, and a space discharge device connected in shunt circuit relation to each capacitor and disposed to be rendered conducting on flow of current through the arc discharge device individual thereto.

HANS KLEMPERER.

DISCLAIMER 1,995,810.—*Hans Klemperer*, New York, N. Y. ELECTRIC WELDING CONTROL SYSTEM. Patent dated March 26, 1935. Disclaimer filed November 24, 1936, by the assignee, *Westinghouse Electric & Manufacturing Company*.

Hereby enters this disclaimer as to claims 1, 2, 3, 5, 6, and 8 of the patent specification.

[*Official Gazette December 15, 1936.*]